Feb. 10, 1959  J. B. ARROWOOD  2,872,732
LAWN EDGER
Filed Oct. 4, 1957
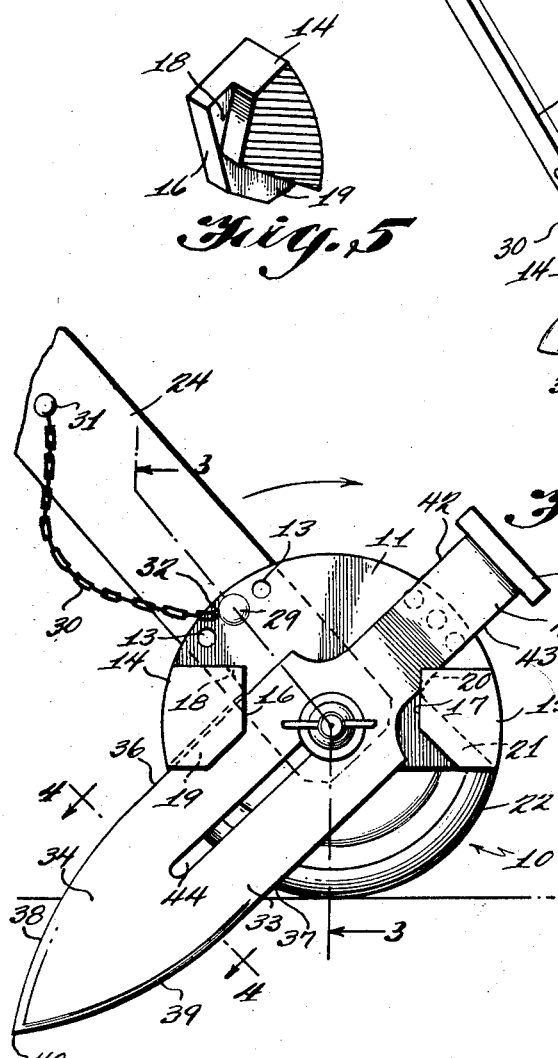
INVENTOR
JOHN B. ARROWOOD
BY
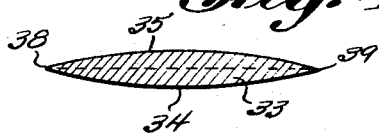
ATTORNEYS

United States Patent Office 2,872,732
Patented Feb. 10, 1959

2,872,732
LAWN EDGER
John B. Arrowood, Baltimore, Md.
Application October 4, 1957, Serial No. 688,221
3 Claims. (Cl. 30—314)

The present invention relates to lawn edgers and particularly to lawn edgers of the type which can be reversed for use on opposite edges of the lawn.

The primary object of the invention is to provide a lawn edger having a reversible blade and a reversible handle and means for securing the blade and handle in reversed positions.

Another object of the invention is to provide a lawn edger of the class described above having a ground engaging wheel supporting the edger blade in fixed position with respect to the lawn to be edged.

A further object of the invention is to provide a lawn edger of the class described above which is inexpensive to manufacture, simple to use, and which can be assembled and disassembled for sharpening and repair with a minimum of effort.

Other objects and advantages will become apparent in the following specification when considered in light of the attached drawings in which:

Figure 1 is a perspective view of the invention.

Figure 2 is an enlarged fragmentary side elevation of the invention.

Figure 3 is a vertical cross section taken along the line 3—3 of Figure 2, looking in the direction of the arrows.

Figure 4 is a transverse cross section of the edger blade taken along the line 4—4 of Figure 2, looking in the direction of the arrows.

Figure 5 is a perspective view of one of the blade holding blocks removed from the frame.

Referring now to the drawings in details wherein like reference characters indicate like parts throughout the several figures, the reference numeral 10 indicates generally a lawn edger constructed in accordance with the invention.

The lawn edger 10 comprises a semi-circular frame plate 11 having a central bore 12 extending therethrough. The plate 11 has a plurality of bores 13 formed therein adjacent the peripheral edge thereof and radially spaced equally from the bore 12.

The frame 11 is provided with a pair of opposed blocks 14, 15 arranged adjacent the lower edge of the frame 11 and equidistantly spaced outwardly from the bore 12. The block 14 and the block 15 have opposed parallel faces 16, 17 respectively. The block 14 is provided with a groove 18 adjacent the frame 11 and extending at approximately 45 degrees to the inner face 16. The block 14 is further provided with a lower groove 19 adjacent the plate 11 and extending perpendicularly to the groove 18. The block 15 is provided with an upper groove 20 adjacent the frame 11 and extending at approximately 45 degrees to the inner face 17. The block 15 is further provided with a lower groove 21 adjacent the frame 11 and extending perpendicularly to the groove 20.

A ground engaging wheel 22 is journaled on a shaft having a head 23a on one end thereof. An elongated handle 24 has a bore 25 therein engaged over the shaft and a washer 26 is positioned on the shaft 23 between the handle 24 and the wheel 22. The shaft is provided with an axially extending reduced end portion 27 projecting beyond the handle 24 and extending through the bore 12 in the frame plate 11.

The handle 24 is provided with a bore 28 parallel to the bore 25 and spaced radially outwardly therefrom in position to align with any one of the bores 13 in the plate 11. A headed pin 29 is slidably engaged in the bore 28 after extending through a selected one of the bores 13 to couple the handle 24 to the frame 11 to prevent relative rotation therebetween. An elongated chain 30 has the upper end thereof secured at 31 to the handle 24 and the lower end thereof secured to the pin 29 at 32. The chain 30 tethers the pin 29 to prevent its loss. With the pin 29 disengaged from the bore 28 the handle 24 can be adjusted with respect to the frame plate 11 and the pin 29 engaged through a newly selected bore 13 therein and through the bore 28.

An elongated cutter blade 33 has arcuate opposite side faces 34, 35 and sharpened parallel cutting edges 36, 37 which have arcuate converging terminal portions 38, 39 respectively meeting in a point 40. The cutting blade 33 has a shank 41 extending upwardly therefrom having side edges 42, 43 arranged in parallel relation to the cutting edges 36, 37. The side edges 42, 43 of the shank 41 are spaced inwardly from the cutting edges 36, 37 so that the shank 41 is somewhat narrower than the cutting blade 33. A longitudinal slot 44 is formed in the cutting blade 33 intermediate the cutting edges 36, 37 adjacent the shank 41.

The slot 44 engages over the reduced end portion 27 of the shaft and the cutting blade 33 engages the frame plate 11 and is secured thereon by a wing nut 45, engaging a washer 46. The cutting blade 33 is tilted at an angle to the vertical when in normal cutting position with the cutting edge 36 engaged in the groove 19 and the edge 43 of the shank 41 engaged in the groove 20. The cutting blade 33 can be reversed so that the cutting edge 37 engages in the groove 21 and the edge 42 of the shank 41 engages in the groove 18.

The grooves 19 and 21 are sufficiently deep so that the cutting edges 36, 37 respectively cannot engage against the space of the grooves 19 and 21 since the edges 42, 43 of the shank 41 engage the base of the grooves 18, 20 respectively and maintain the cutting edges 36, 37 out of contact with the base of the grooves 19, 21 respectively. Since the cutting edges 36, 37 cannot engage the base of the grooves 19, 21 respectively, the cutting edges 36, 37 are not dulled unnecessarily.

A plate 47 is welded to the upper end of the shank 41 to provide a platform to apply foot pressure to the blade 33.

In the use and operation of the invention, the blade 33 is placed perpendicularly with respect to the ground intermediately between the blocks 14 and 15 and is pushed into the earth by hand or by foot, the edger pin being rolled forwardly at the same time in the direction of the arrow as seen in Figure 2. The cutting blade 33 automatically assumes the correct cutting angle engaging the blocks 14 and 15 sloping rearwardly so as to cut the grass and sod as the edger is moved forwardly.

The handle 24 can have the angle thereof with respect to the frame 11 adjusted by engaging the drive pin 29 in any one of the selected bores 13 in the frame plate 11 and the cutting blade 33 can be reversed as explained above for operation in the opposite direction.

Having thus described the preferred embodiment of the invention it should be understood that numerous structural modifications and adaptations may be resorted to without departing from the scope of the appended claims.

What is claimed is:

1. A lawn edger comprising a semi-circular frame plate having a straight lower edge and an upper semi-circular peripheral edge, a pair of opposed spaced apart blade engaging blocks secured to one face of said plate adjacent the lower edge thereof and extending laterally therefrom, said plate having a bore intermediate said blocks adjacent said lower edge, said plate having a plurality of bores arranged equidistantly inwardly from the peripheral edge thereof in circumferentially spaced relation, a shaft mounted for rotation in said first named bore in said plate, a wheel journaled on said shaft, a handle mounted on said shaft intermediate the other side of said plate and said wheel, means extending through one of the plurality of bores in said plate and through said handle releasably locking said handle to said plate, and a cutter blade engaged over said shaft against said plate, said cutter blade bearing against one of said blocks and projecting below said wheel at an angle to the vertical, said blade being rotatably shiftable on said shaft to a reverse position bearing against the other of said blocks.

2. A device as claimed in claim 1 wherein said blade is provided with opposite disposed cutting edges and with an elongated slot engaging over said shaft.

3. A device as claimed in claim 2 wherein said blade is provided with a transverse plate fixed to its upper end to provide an integral foot engaging device to force said blade into the ground.

References Cited in the file of this patent

UNITED STATES PATENTS

| | | |
|---|---|---|
| 281,110 | Mitchell | July 10, 1883 |
| 841,708 | McClure | Jan. 22, 1907 |
| 1,379,205 | Ogden | May 24, 1921 |
| 1,562,174 | Johnson | Nov. 17, 1925 |
| 1,610,874 | Marthen | Dec. 14, 1926 |
| 2,021,625 | Fell | Nov. 19, 1935 |
| 2,288,374 | Steele | June 30, 1942 |
| 2,419,167 | Sanford | Apr. 15, 1947 |
| 2,506,371 | Lint | May 2, 1950 |
| 2,639,654 | Baunsgard et al. | May 26, 1953 |
| 2,650,422 | Soltow et al. | Sept. 1, 1953 |